Jan. 14, 1936. P. L. BARBER Re. 19,819

MOLDED CONTAINER

Original Filed May 24, 1932 2 Sheets-Sheet 1

Inventor

P. Lee Barber

By Clarence A. O'Brien

Attorney

Jan. 14, 1936. P. L. BARBER Re. 19,819

MOLDED CONTAINER

Original Filed May 24, 1932 2 Sheets-Sheet 2

Inventor

P. Lee Barber

By Clarence A. O'Brien

Attorney

Reissued Jan. 14, 1936

Re. 19,819

UNITED STATES PATENT OFFICE 19,819

MOLDED CONTAINER

Pearley Lee Barber, Turner, Oreg.

Original No. 1,991,649, dated February 19, 1935, Serial No. 613,312, May 24, 1932. Application for reissue August 13, 1935, Serial No. 35,992

8 Claims. (Cl. 107—19)

This invention relates to molded containers and to improvements in molds for making the same.

The subject matter of the invention relates to certain modifications and improvements in the construction of molds for molding edible confections into hollow containers of the type used to package other confections. An important feature of the inventive concept is that such containers may be so constructed as to permit removal of the contained confection without destruction of the container. The inventive concept also includes the provision of a mold for molding hollow containers comprising two or more variant sections which may be conjoined telescopically to provide easy access to confections contained therewithin.

It is a primary object of the invention to provide a mold for molding edible confections into hollow containers of the type used to package other confections, which containers are made in separable sections which may be easily taken apart or put together for opening or closing them.

It is a further object of the invention to provide a mold for molding edible confections into hollow containers which may be used to package other confections, and which will permit removal of the contained confection from the container without injury to the container.

It is a further object of the invention to provide a mold for molding hollow containers having two or more variant sections adapted for telescopic engagement.

Other objects and advantages of the invention will become apparent from a reading of the following description of the drawings, wherein, for purposes of illustration, is shown a preferred embodiment of the invention.

Figure 1:
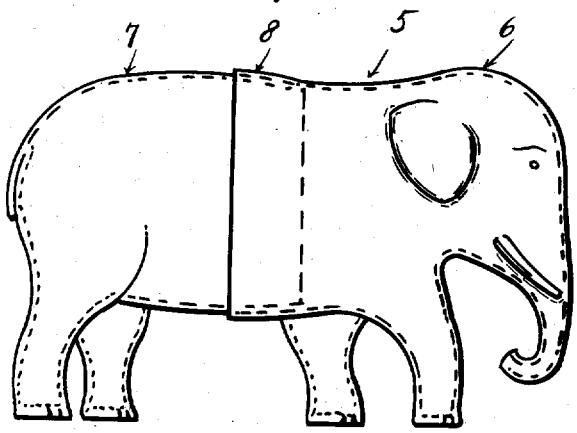
Figure 1 is a side elevation of a preferred form of container constructed in accordance with the principles of the present invention.

Parawax, a chewable confection, and chocolate and the like, have long been used for forming containers for confections, and to constitute forms adapted to be utilized as ornaments or displays, whether unfilled or filled with confection or the like, or as toys. Different methods of making and forming such containers have been in use, but to applicant's knowledge no one of these methods affords the advantages of the structure which is achieved by the improved mold embodying the present invention, by virtue of which separable hollow sections are provided which are adapted to be assembled and disassembled in a quick and easy and convenient manner.

Referring to the drawings in detail, wherein like numerals refer to like parts throughout the several views, the numeral 5 generally designates a container in the form of an animal constructed in accordance with the principles of my invention, and which is composed of the front section 6 and the rear section 7. The rear end of the front section 6 is provided with an expanded sleeve portion 8 into which is adapted to be telescoped the front part of the rear section 7. The sections may be recessed so that the resulting container will be hollow so as to be capable of containing confections of any desired type.

The article itself may be constructed of parawax or an equivalent, or of other confection such as chocolate or the like. Because of the construction of the container, it is an easy matter to connect and disconnect the front and rear sections thereof in telescoped fashion without damaging or impairing the form, whether unfilled or filled with confection or the like, whereas most forms now in use necessarily involve damaging or impairing some part of the container in order to enable the removal of the contents thereof or for other purposes.

Figure 2:
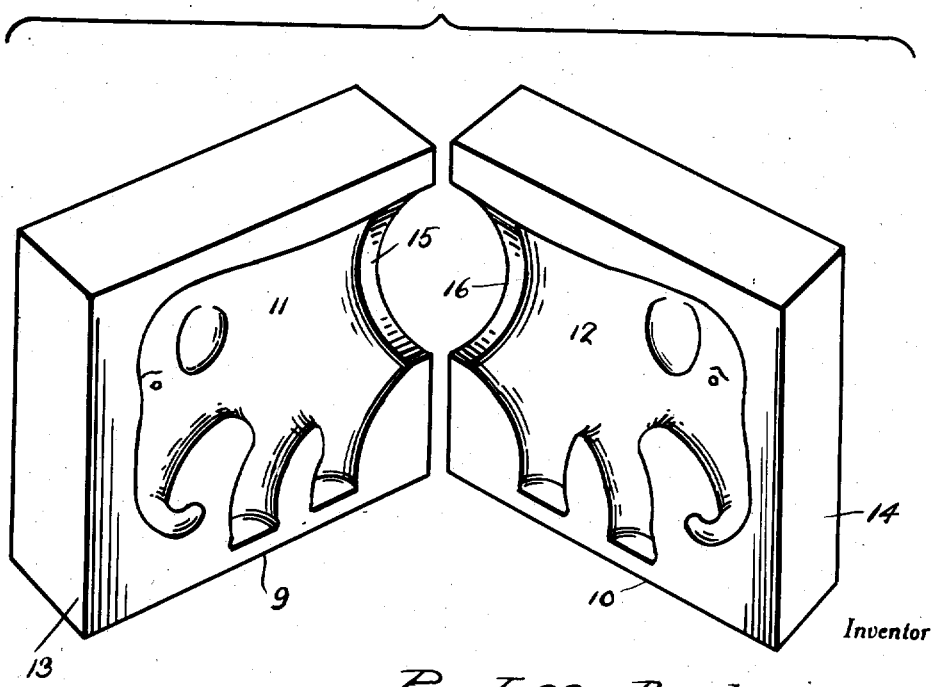
Figure 2 is a group view in perspective of the halves of the front portion of the mold which is employed to mold the container illustrated in Figure 1.
Figure 3:
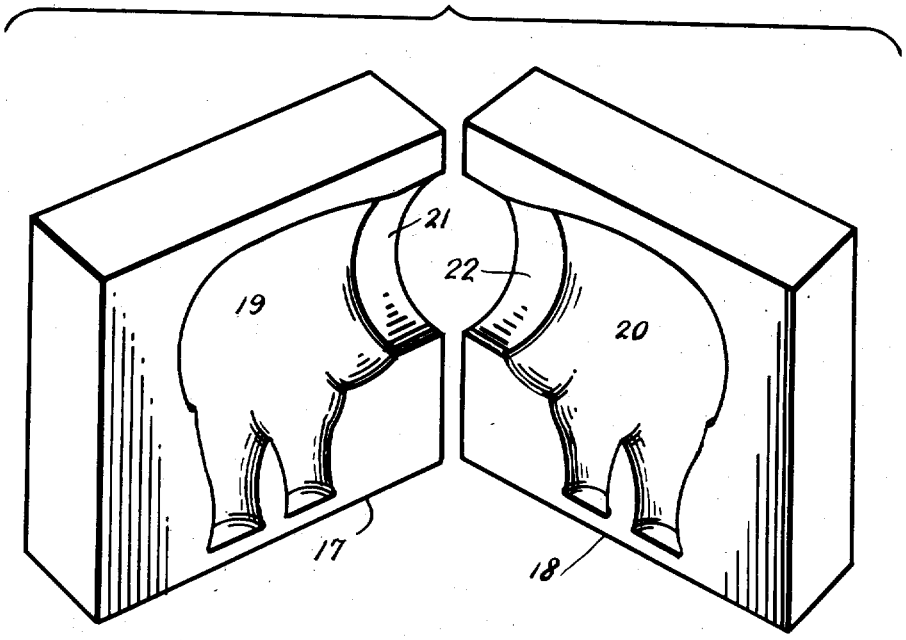
Figure 3 is a similar view of the rear sections of the mold.
Figure 4:
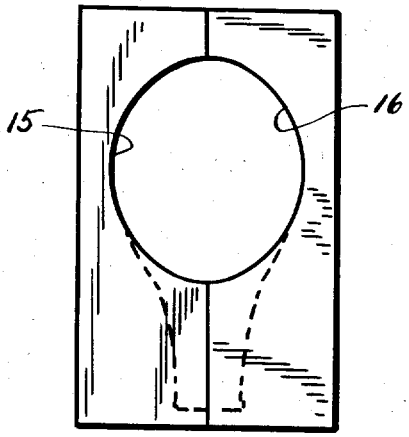
Figure 4 is an end view of a pair of the mold sections in abutted relationship.
Figure 5:
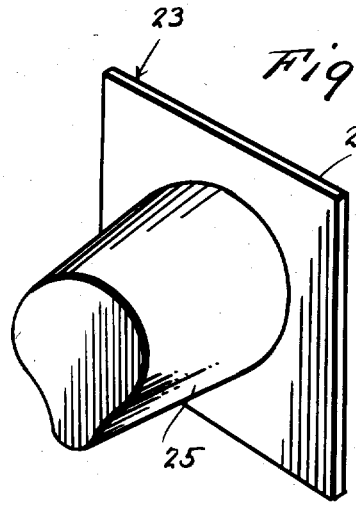
Figure 5 is a perspective view of one of the mold cores.

Reference to Figures 2 to 5 of the drawings discloses the provision of a pair of front mold sections 9 and 10, which may be formed of aluminum to secure light weight, or of any other suitable material adapted for use as a mold block. The sections 9 and 10, as shown, are generally rectangular in form for convenience, and are provided on their inner faces with depressions 11 and 12 which, in contour, represent half of the forepart of the article selected.

It will be observed that while the front ends 13 and 14 of the blocks 9 and 10 are plain and unindented, the corresponding rear ends are curvedly cut away as indicated at 15 and 16 to provide an orifice. In the front sections 9 and 10, this orifice is of a contour and size to form the expanded sleeve portion 8, while the corresponding orifice in the front ends of the blocks 17 and 18 of the rear mold section is such as to provide the reduced telescoping portion on the front end of the rear section. The depressions 19 and 20 in the rear mold sections are of a contour to form the rear portion of the article selected. The numerals 21 and 22 indicate the portions which define the orifice in the front end of the rear mold section. As intimated, the halves of the container are to be cast separately in the pairs of blocks 9—10 and 17—18. The sections are then assembled by telescoping as already mentioned.

In some instances it will be necessary to use the cores generally designated at 23, which comprise the plate 24 for engaging the ends of the mold sections and the laterally projecting specially formed block 25 carried thereby, which is designed to be so positioned in spaced relation within the orifices mentioned as to procure formation of the container sections with an interior recess or hollow, as when chocolate or the like is used in molding the containers. Where, however, parawax and the like is used as the molding material, these core forms will not be required, as the method in the use of parawax is to pour the parawax into the mold section and then to pour out the excess of parawax, sufficient of the parawax adhering to the walls of the mold section as a result of this operation to constitute the form upon solidifying.

Of course, my invention is not limited to the formation of animal forms as illustrated in the drawings, but any form may be made as desired. In this manner, attractive and useful novelties of a wide variety of forms may be cheaply constructed so as to possess the advantages mentioned, and other obvious advantages, for use as containers, souvenirs, novelties, or toys.

Though I have shown and described herein a preferred embodiment of the invention, it is to be definitely understood that I do not desire to limit the application of the invention thereto, and any change or changes may be made in material and structure and arrangement of parts, and in sequence and duration of steps and operations involved in the method, within the spirit of the invention and scope of the subjoined claims.

Having now described my invention and in what manner the same may be used, what I claim as new and desire to protect by Letters Patent is:

1. A mold for molding a hollow article having two or more separable sections: comprising a pair of longitudinally separable mold blocks, each of which is provided on its meeting face with a recess formed to the shape of a side of one section of said article and having a tapered semi-annular annulus through one end of each block, said blocks being arranged to have their meeting faces engaged during the process of molding; a pair of longitudinally separable mold blocks, each of which is provided on its meeting face with a recess formed to the shape of a side of the other section of said article and having a semi-annular opening through one end of each block; the last mentioned semi-annular opening cooperable to define an annulus when the last mentioned blocks have their meeting faces engaged, said annulus being of larger diameter but conforming to the flare of the tapered annulus formed by the tapering semi-annuli when the meeting faces of the first mentioned mold blocks are engaged.

2. A mold for molding a hollow article having two or more separable sections: comprising a pair of longitudinally separable mold blocks, each of which is provided on its meeting face with a recess formed to the shape of a side of one section of said article and having a tapered semi-annular annulus through one end of each block, said blocks being arranged to have their meeting faces engaged during the process of molding; a pair of longitudinally separable mold blocks, each of which is provided on its meeting face with a recess formed to the shape of a side of the other section of said article and having a semi-annular opening through one end of each block; the last mentioned semi-annular opening cooperable to define an annulus when the last mentioned blocks have their meeting faces engaged, said annulus being of larger diameter but conforming to the flare of the tapered annulus formed by the tapering semi-annuli when the meeting faces of the first mentioned mold blocks are engaged; and a tapering core to be disposed in spaced relation to said last described annulus to insure accurate interior surfaces in said annulus, said core being mounted on a plate engageable with the open end of the assembled mold blocks for supporting said core in position.

3. A mold for molding edible confections into hollow containers: comprising two or more mold sections for forming opposed end portions, respectively, of said container; each of said mold sections consisting of a pair of blocks disposed in side by side abutting relation and having in their abutting sides registering depressions defining recesses conforming in shape to the corresponding opposite sides of the respective ends of the container; the recess forming depressions of one of said pair of mold blocks extending through one end thereof and defining a flared opening designed to produce a flaring flange in the open end of one of said end portions of the container; the recess forming depressions of the other of said pair of mold blocks extending through an end thereof and defining an outwardly converging tapering opening designed to produce a tapering flange at the open end of the other of said end portions of the container frictionally telescopable into said flaring flange to separably connect the opposed ends of said container.

4. A mold for molding edible confections into hollow containers: comprising two or more mold sections for forming opposed end portions, respectively, of said container; each of said mold sections consisting of a pair of blocks disposed in side by side abutting relation and having in their abutting sides registering depressions defining recesses conforming in shape to the corresponding opposite sides of the respective ends of the container; the recess forming depressions of one of said pair of mold blocks extending through one end thereof and defining a flared opening designed to produce a flaring flange in the open end of one of said end portions of the container; the recess forming depressions of the other of said pair of mold blocks extending through an end thereof and defining an outwardly converging tapering opening designed to produce a tapering flange at the open end of the other of said end portions of the container frictionally telescopable into said flaring flange to separably connect the opposed ends of said container; said convergingly tapered opening and said flaring opening being relatively axially elongated so as to produce unusual axial elongation of said flaring flange and of said tapering flange.

5. A mold for molding edible confections into hollow containers: comprising two or more mold sections for forming opposed end portions, respectively of said container; each of said mold sections consisting of a pair of blocks disposed in side by side abutting relation and having in their abutting sides registering depressions defining recesses conforming in shape to the corresponding opposite sides of the respective ends of the container; the recess forming depressions of one of said pair of mold blocks extending through one end thereof and defining a flared opening designed to produce a flaring flange in the open end of one of said end portions of the container; the recess forming depressions of the other of said pair of mold blocks extending through an end thereof and defining an outwardly converging tapering opening designed to produce a tapering flange at the open end of the other of said end portions of the container frictionally telescopable into said flaring flange to separably connect the opposed ends of said container; and a core supported within and substantially concentrically spaced from the sides of said flaring opening, the exterior of said core having a taper conforming substantially to the taper of the interior of said convergingly tapered opening of one end portion and with the exterior taper of the tapering flange of the other end portion, whereby the interior of said flaring flange is conditioned to conformably and frictionally receive and hold said tapering flange.

6. A mold for making a hollow edible material animal form in two parts, said mold consisting of a hind member and a fore member, said hind member consisting of a pair of longitudinally separable sections each of which is provided on its meeting face with a recess formed to the shape of one side of the hind part of said animal form including a forwardly tapered semi-annular region opening through the front end of the section, said sections being arranged to have their meeting faces engaged during the molding; said fore member consisting of a pair of longitudinally separable sections each of which is provided on its meeting face with a recess formed to the shape of a side of the fore part of said animal and including a rearwardly flaring semi-annular region opening through the rear end of the section, and last mentioned semi-annular region defining a rearwardly flaring annulus when the last mentioned sections have their meeting faces engaged, said annulus being of larger diameter but conforming flare to the tapered annulus formed by said tapering semi-annuli as a result of engaging the meeting faces of sections of the hind member.

7. A mold for making a hollow edible material animal form in two parts, said mold comprising a hind member and a fore member, said hind member consisting of a pair of longitudinally separable sections each of which is provided on its meeting face with a recess formed to the shape of one side of the hind part of said animal form including a forwardly tapered semi-annular region opening through the front end of the section, said sections being arranged to have their meeting faces engaged during the molding; said fore member consisting of a pair of longitudinally separable sections each of which is provided on its meeting face with a recess formed to the shape of a side of the fore part of said animal and including a rearwardly flaring semi-annular region opening through the rear end of the section, the last mentioned semi-annular region defining a rearwardly flaring annulus when the last mentioned sections have their meeting faces engaged, said annulus being of larger diameter but conforming flare to the tapered annulus formed by said tapering semi-annuli as a result of engaging the meeting faces of sections of the hind member, and a tapering core to be disposed in spaced relation to said flaring annulus to assure accurate interior surfaces in said flaring annulus, said core being mounted on a plate engageable with the rearward end of the assembled fore member for supporting said core in position.

8. A mold of the character described comprising a front member and a rear member for forming the forepart and hindpart respectively of a hollow edible material animal form when the edible material is poured therein in fluid form and permitted to harden, each of said members consisting of a pair of blocks disposed in side by side abutting relation and having in their abutting sides registering depressions defining recesses conforming in shape to the corresponding opposite sides of the respective forepart and hindpart of the animal form, the recess forming depressions of the front member extending through the rear thereof and defining a flared opening designed to produce a flaring flange on the rear end of the forepart of the animal form, the recess forming depressions of the rear member extending through the front thereof and defining a forwardly converging tapering opening designed to produce a tapering flange on the front of the hindpart of the animal form frictionally telescopable into said flaring flange to separably connect the forepart and the hindpart of said animal form.

PEARLEY LEE BARBER.